United States Patent [19]

Sheppard et al.

[11] 4,009,614
[45] Mar. 1, 1977

[54] APPARATUS FOR MONITORING TWO-PHASE FLOW

[75] Inventors: John D. Sheppard, Oak Ridge, Tenn.; Long S. Tong, Gaithersburg, Md.

[73] Assignee: The United States of America as represented by the United States Energy Research and Development Administration, Washington, D.C.

[22] Filed: Dec. 19, 1975

[21] Appl. No.: 642,439

[52] U.S. Cl. ................................. 73/195; 73/198; 73/231 M
[51] Int. Cl.² ......................................... G01F 1/86
[58] Field of Search ................ 73/194 M, 195, 229, 73/231 R, 231 M, 198

[56] References Cited
UNITED STATES PATENTS

| | | | |
|---|---|---|---|
| 1,917,710 | 7/1933 | Groetken | 73/231 R X |
| 2,896,084 | 7/1959 | MacDonald | 73/194 M X |

Primary Examiner—James J. Gill
Attorney, Agent, or Firm—Dean E. Carlson; David S. Zachry; Louis M. Deckelmann

[57] ABSTRACT

A method and apparatus for monitoring two-phase flow is provided that is particularly related to the monitoring of transient two-phase (liquid-vapor) flow rates such as may occur during a pressurized water reactor core blow-down. The present invention essentially comprises the use of flanged wire screens or similar devices, such as perforated plates, to produce certain desirable effects in the flow regime for monitoring purposes. One desirable effect is a measurable and reproducible pressure drop across the screen. The pressure drop can be characterized for various known flow rates and then used to monitor nonhomogeneous flow regimes. Another useful effect of the use of screens or plates in nonhomogeneous flow is that such apparatus tends to create a uniformly dispersed flow regime in the immediate downstream vicinity. This is a desirable effect because it usually increases the accuracy of flow rate measurements determined by conventional methods.

3 Claims, 9 Drawing Figures

APPARATUS FOR MONITORING TWO-PHASE FLOW

BACKGROUND OF THE INVENTION

This invention was made in the course of, or under, a contract with the Energy Research and Development Administration.

The experimental study of a Loss-of-Coolant Accident (LOCA) for water-cooled nuclear reactors requires monitoring transient two-phase (liquid-vapor) flow rates during a simulated reactor core blowdown. The Thermal Hydraulic Test Facility (THTF), part of the Oak Ridge National Laboratory's Blowdown Heat Transfer (BDHT) Program, utilizes instrumented piping spool pieces for flow monitoring. Each spool piece includes a drag disk flowmeter, a turbine flowmeter, a gamma densitometer, and pressure and temperature instruments. Since the drag disk and densitometer sample only a small section of the flow, accurate flow measurements by these instruments require that the two phases are uniformly dispersed across the pipe cross section. However, in a test facility such as THTF, a variety of two-phase flow regimes (e.g., stratified or annular) may exist so that the measurements of the instrumented spool piece are then not necessarily representative of the actual flow. This is a problem common to many systems wherein two-phase flow exists.

Thus, there existed a need prior to the present invention to provide some means to increase the accuracy of two-phase flow measurements. The present invention was conceived to meet this need in a manner to be described hereinbelow.

SUMMARY OF THE INVENTION

It is the object of the present invention to provide an improved method and apparatus for improving the accuracy of flow rate measurements through a conduit wherein two-phase conditions exist.

The above object has been accomplished in the present invention by providing flanged wire screens or similar devices, such as perforated plates, in a pipe upstream of flow measuring instruments such that the accuracy of flow rate measurements from the instruments are substantially improved over those achieved heretofore. Also, by utilizing such a flanged screen or perforated plate for flow monitoring purposes, a measurable and reproducible pressure drop across the screen or plate is provided. The pressure drop can be characterized for various known flow rates and then used to monitor nonhomogeneous flow regimes.

DESCRIPTION OF THE PREFERRED EMBODIMENT

Figure 1:
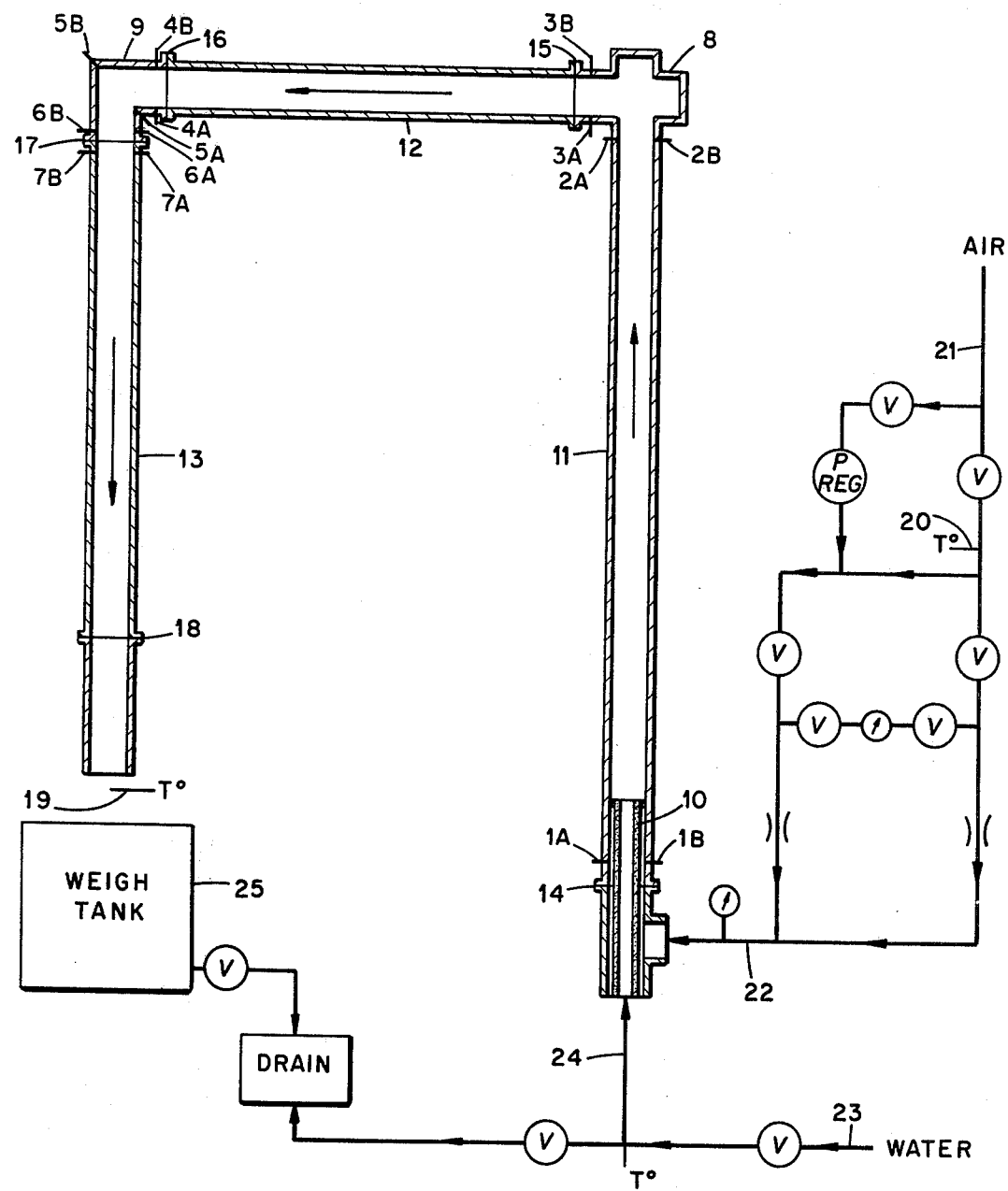
FIG. 1 is a schematic diagram of an air-water flow system utilized for studying two-phase flow through a piping system.

FIG. 1 is an air-water flow system which is utilized for studying two-phase flow through an instrumented piping spool piece. In FIG. 1, a first vertical tube 11 has a porous tube 10 mounted within the lower portion thereof and there is a flange 14 provided in the lower portion of tube 11 which divides the porous tube 10 with pressure taps 1A and 1B mounted in the tube 11 just above the flange 14. Pressurized air from a source, not shown, is fed by means of a line 21 and various valves and a regulator and a line 22 to the lower portion of the tube 11 below the flange 14, as shown in FIG. 1. Water from a source, not shown, is fed by means of a line 23, a valve and a line 24 to supply water at a desired flow rate to the bottom of the tube 11, as shown in FIG. 1.

Tube 11 is connected by means of a 90° section 8 and a flange 15 to a horizontal section of pipe 12, and the pipe 12 in turn connected by means of a flange 16, a 90° elbow 9 and a flange 17 to a second vertical pipe 13 which is provided with another flange 18 in the lower portion thereof. The tube 13 drains into a weigh tank 25 and the temperature of the exiting air-water mixture may be monitored by a thermocouple 19. The temperature of the air in line 21 may be monitored by a thermocouple 20, and the water temperature by another thermocouple as shown in FIG. 1. In addition to the pressure taps 1A–1B, there are provided further pressure taps 2A–2B, 3A–3B, 4A–4B, 5A–5B, 6A–6B, and 7A–7B as shown in FIG. 1.

The vertical pipe section 13 is an instrumented spool piece that contains a turbine flowmeter, a drag disk flowmeter and a gamma densitometer therewithin, with the turbine and drag disk flowmeters about 2 feet apart with the densitometer located between the flowmeters.

The drag disk flowmeter is manufactured by the Ramapo Instrument Co., Bloomingdale, N.J. model Mark IV. It is a disk positioned in the center of a pipe section supported by a flexible arm on which is mounted a strain gage.

In tests of the device of FIG. 1, the effect on instrument accuracy of flow-dispersing screens or perforated plates installed at the upstream flange 17 of the spool piece 13 has been determined as discussed hereinbelow. Air and water are metered into the device of FIG. 1, and the actual mass flow rate is compared with the flow rate determined from the spool piece outputs using, for example, the Aya model for calculating two-phase mass flow rates from the turbine meter, drag disk meter, and densitometer data. Using Aya's model, the mass flow rate is given as:

$$G = [\alpha \rho_g S + (1-\alpha) \rho_f] \cdot V_t \left[ \frac{1 + \left[ C_t \left(\frac{\rho_f}{\rho_g}\right) \left(\frac{1-\alpha}{\alpha}\right) \right]^{1/2}}{S + \left[ C_t \left(\frac{\rho_f}{\rho_g}\right) \left(\frac{1-\alpha}{\alpha}\right) \right]^{1/2}} \right] \quad (1)$$

where $\alpha$ is the void fraction; $S$ is the slip ratio ($V_g/V_f$); $\rho_g$ and $\rho_f$ are densities of gas and liquid phases, respectively; $V_t$ is the apparent velocity given by the turbine meter; and $\overline{C_t}$ is the ratio of the turbine drag coefficient for the liquid phase to the turbine drag coefficient for the gas phase. The apparent velocity, $V_t$, is determined directly from the turbine meter output and calibration data. Turbine drag coefficients $C_{df}$ and $C_{dg}$, are determined experimentally. Void fraction and slip ratio are determined from the drag disk meter and densitometer readings.

For example, the Aya model utilized the following expression for the momentum flux $I_d = \rho_a V^2$, measured by the drag disk:

$$I_d = C_{dg} \alpha \rho_g V_g^2 + C_{df} (1-\alpha) \rho_f V_f^2, \quad (2)$$

where $C_{dg}$ and $C_{df}$ are the drag coefficients for the gas and liquid phases, respectively; and $V_g$ and $V_f$ are the mean velocities of the two phases. Further, the apparent fluid density in the spool piece is defined as:

$$\rho_a = \alpha \rho_g + (1-\alpha) \rho_f \quad (3)$$

and represents that density directly measured by the gamma densitometer. The drag disk measurement may then be expressed as:

$$I_d = C_{dg} \left[ \frac{\rho_f - \rho_a}{\rho_f} \right] \rho_g V_g^2 + C_{df} (\rho_a - \rho_g) V_f^2, \quad (4)$$

since, whether the gas phase is air or water vapor, $\rho_f \gg \rho_g$. It is of interest to inspect equation (4) over the range of possible values of $\rho_a$.

If
$$\rho_a \simeq \rho_g,$$
$$I_d \simeq C_{dg} \rho_g V_g^2; \quad (5)$$

and if
$$\rho_a \simeq \rho_f,$$
$$I_d \simeq C_{df} \rho_a V_f^2. \quad (6)$$

Further, since $\rho_g/\rho_f \simeq 10^{-3}$, and if the slip ratio $V_g/V_f \simeq 2$, then for values of the apparent density as low as $\rho_a = 1 \, \text{lb}_m/\text{ft}^3$, a reasonable expression for the drag disk measurement is:

$$I_d = C_{df} \rho_a V_f^2, \quad (7)$$

which indicates the influence of the water flow on the drag disk reading.

The comparison of the metered mass flow rates with flow rates predicted from measurements of the instrumented spool piece is a test of two experimental uncertainties: (1) the effect of the character of the velocity profile, as influenced by either particular flow-dispersing screens or by the position of the individual instruments relative to each other and the direction of flow; and (2) the use of single-phase (water) calibration data to predict two-phase flow rates.

Additional information is required from the continuity equations of flow for the two phases:

$$\alpha V_g = \alpha_h V_{gh}, \quad (8a)$$

and
$$(1-\alpha) \cdot V_f = (1-\alpha_h) \cdot V_{fh}, \quad (8b)$$

where the subscript $h$ refers to the homogeneous condition. Combining equations 8a and 3, and equations 8b and 3 gives:

$$V_g = \frac{(\rho_f - \rho_h)}{(\rho_f - \rho_a)} V_{gh} \quad (9)$$

and
$$V_f = (\rho_h/\rho_a) V_{fh}. \quad (10)$$

if the gas phase density is small in comparison to either the homogeneous or apparent density. The homogeneous density is given from the known input mixture so that $\rho_a$ and $V_f$ are determined from equations (7) and (10), respectively. Information from equations (3), (7), (9), and (10) is then used to calculate the mass flow rate from equation (1). The turbine meter drag coefficients for air and water are expected to be approximately the same, so $\overline{C_t} \simeq 1$ in equation (1); significant deviations from this assumption have only a small effect on the calculated mass flow rate.

It should be noted that the drag disk flowmeter is also known as a target flow meter, wherein the target is a disk less than 10% of the pipe cross section in which it is installed to provide flow information. The various screens or perforated plates utilized in the present invention, as described hereinbelow, provide for a more homogeneous flow through turbine flowmeter and the drag disk flowmeter such that more accurate determinations of the mass flow rate can be achieved.

The results obtained with various spool pieces with the flange 17 including no flow dispersers, perforated plate dispersers, and dispersers fabricated from various wire screens, are illustrated in FIGS. 2-5 of the drawings to which reference is now made.

Figure 2:
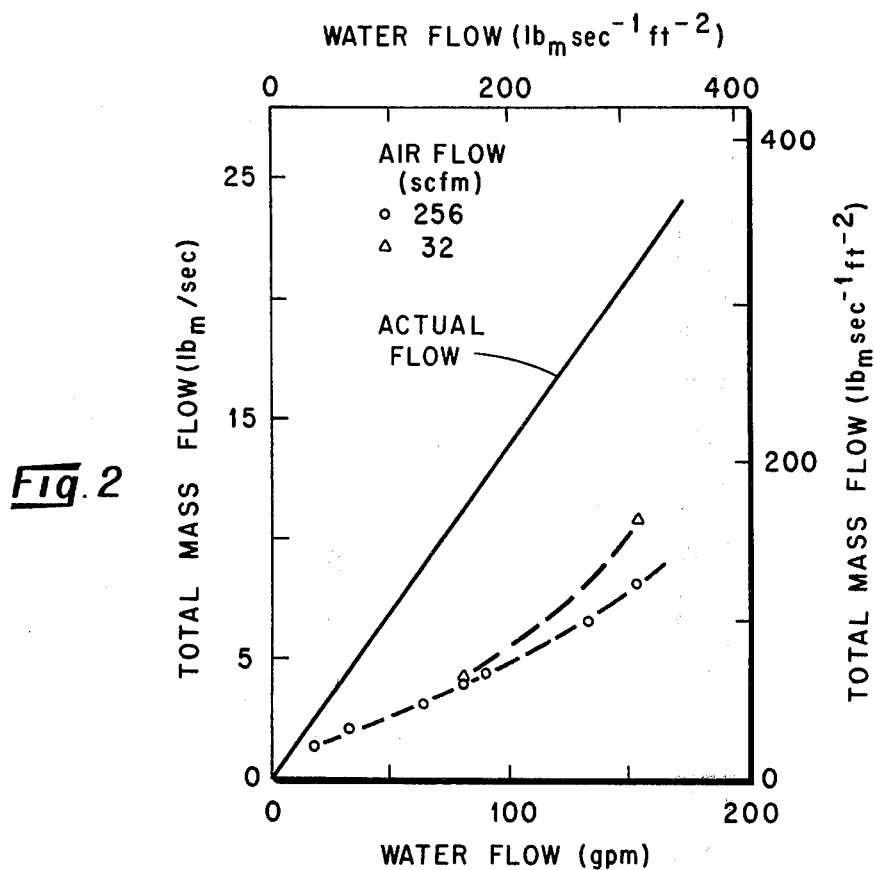
FIG. 2 is a graph illustrating the calculated mass flow rates from the output of turbine and drag disk flow meters and densitometer when the turbine meter was upstream of the drag disk meter in the device of FIG. 1, and flow dispersers (screens) were not used therein.

As mentioned hereinabove, air and water were metered into the system of FIG. 1, so that the actual mass flow rate was known and compared to mass flows determined from the outputs of the spool piece instruments using the Aya Model as discussed above. FIG. 2 shows the mass flow rate calculated from the outputs of the turbine and drag disk flow meters and the densitometer when the turbine meter was positioned upstream of the drag disk meter in the spool piece 13 and no flow dispersers were used in the flange 17. With a fixed, metered air rate (in the range 32 to 256 scfm), water rates were varied over the range 20 to 150 gpm. FIG. 2 shows that when no flow disperser was used in the flange 17, the instrumentation spool piece 13 did not provide an accurate measurement of mass flow rates for air flows of 32 and 256 scfm.

Figure 3:
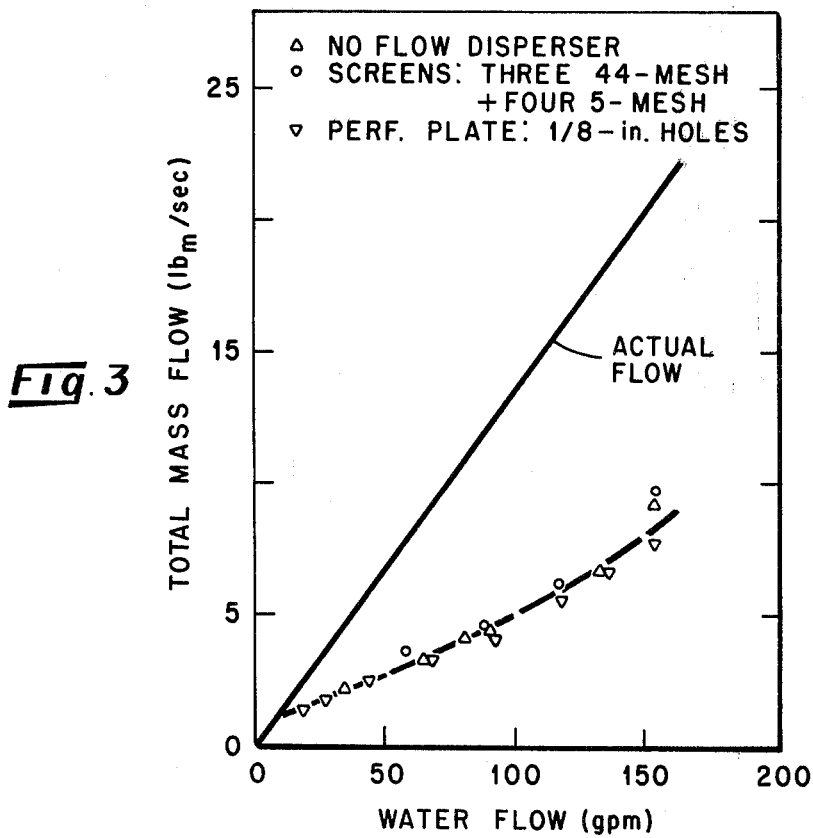
FIG. 3 is a graph illustrating the calculated mass flow rate from the output of an instrumented spool piece of FIG. 1 when the turbine meter was upstream of the drag disk meter and different flow dispersers were used.

Different types of flow dispersing screens or perforated plates were then installed at the inlet flange 17 to the spool piece 13, and mass flow rates were then calculated from the outputs of the spool piece instruments when the turbine meter was positioned upstream of the drag disk meter and were again compared with the actual flow rate as illustrated in FIG. 3. The air flow rate for FIG. 3 was 256 scfm, and it can be seen that the use of flow dispersers resulted in no improvement of the mass flow measurements.

Figure 4:
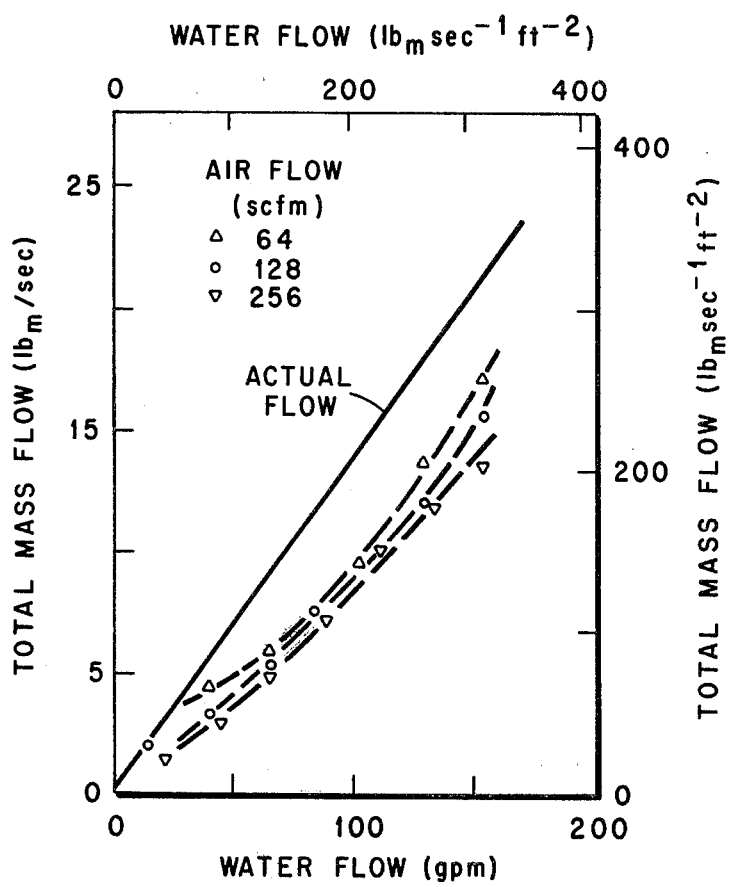
FIG. 4 is a graph illustrating the calculated mass flow rate from the output of an instrumented spool piece of FIG. 1 when the drag disk meter was upstream of the turbine meter and no flow dispersers were utilized.

The spool piece was then oriented with the drag disk meter positioned upstream of the turbine meter. FIG. 4 shows that with no flow disperser being utilized in the flange 17, mass flow rates calculated from the spool piece outputs were more accurate in this orientation than when the turbine meter was positioned upstream of the drag disk meter (e.g., compared with FIG. 2).

Figure 5:
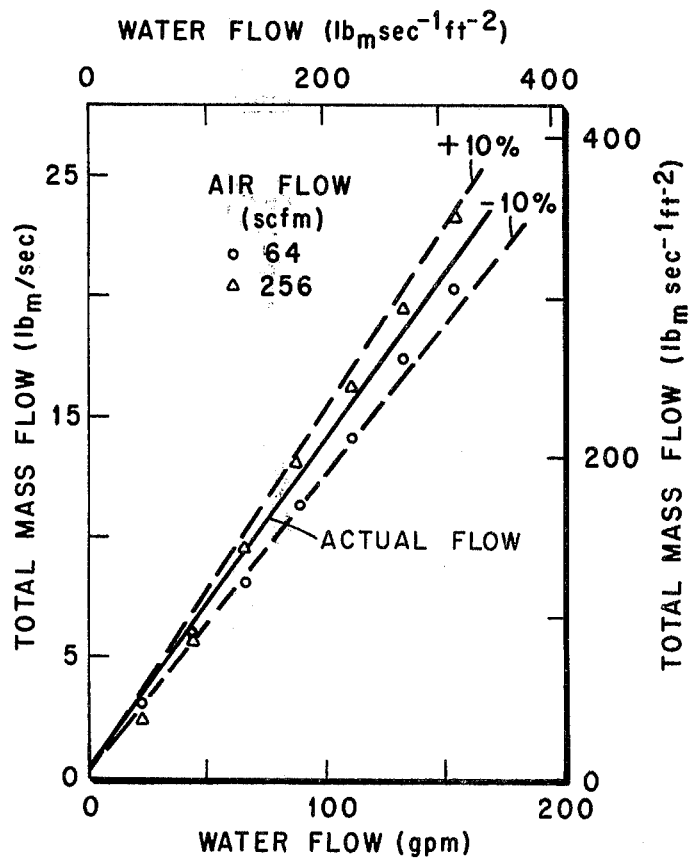
FIG. 5 is a graph illustrating the calculated mass flow rate from the output of an instrumented spool piece of FIG. 1 when the drag disk meter was upstream of the turbine meter and the flow disperser was made with three 44-mesh screens spaced apart by four 5-mesh screens.

FIG. 5 illustrates the mass flow rates calculated from the outputs of the spool piece instruments when the drag disk meter was positioned upstream of the turbine meter, and a flow disperser was mounted in the flange 17 with the disperser made with three 44-mesh screens spaced apart by four 5-mesh screens. It can be seen from FIG. 5 that the calculated mass flow rates were within ± 10 percent of the actual flow over the range of air and water flow rates utilized.

It can be seen from the results shown in FIG. 2-5, in two-phase flow, accurate calculated measurements were attained only when the drag disk meter was positioned upstream of the turbine meter and a flow disperser was installed in the flange 17; that is, when the flow disperser conditions the flow for the drag disk and densitometer. One possible explanation for the result illustrated in FIG. 3 is that the rotational motion of the turbine meter separates the phases and induces an annular flow rather than a dispersed flow. Thus, the position of the flow meters in the spool piece 13 and the use of a flow disperser in the flange 17 as utilized in the device of FIG. 1 to obtain the results shown in FIG. 5 is the preferred embodiment of the present invention; that is, with the drag disk meter positioned upstream of the turbine meter in the spool piece 13 or with a flow disperser between the turbine and drag disk if the turbine is upstream of the drag disk.

In the preferred embodiment of the present invention with the drag disk meter positioned upstream of the turbine meter, it is important to choose a flow disperser that has a relatively low pressure drop thereacross. This is because a pressure drop influences the regime of the two-phase flow to be monitored. For example, studies with several flow dispersers indicate that increased pressure drop across the flow disperser frequently results in increasing pulsating flow.

Figure 6:
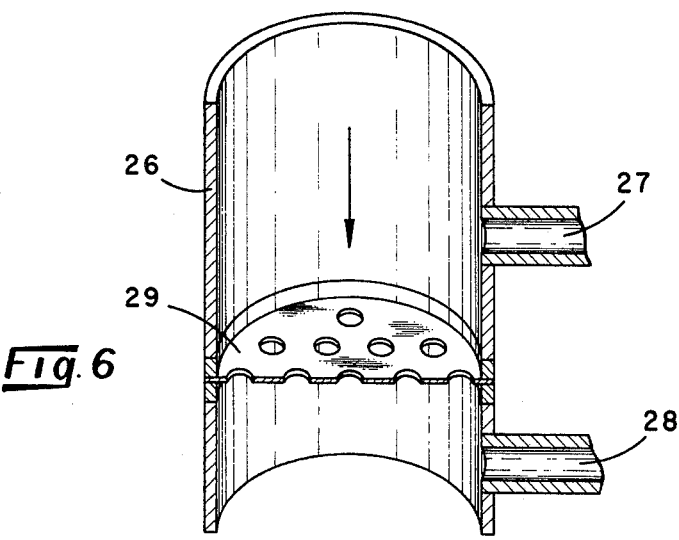
FIG. 6 is a schematic cross-section of a flanged perforated plate that can be utilized in the two-phase flow system of FIG. 1 such that differential pressure can be monitored between pressure taps located in the pipe wall on both sides of the plate.

The device of FIG. 1 can be utilized to directly monitor two-phase flow rates by correlating the characterizable pressure drop across the flange 17 to known flow rates. Either flanged screens or perforated plates can be used to create the pressure drop, and conventional equipment, such as manometers, pressure gages, differential pressure cells, etc., can be used to measure the pressure drop. FIG. 6 is a schematic cross-section view of a flanged perforated plate that can be utilized in the device of FIG. 1, such that differential pressure can be monitored between taps located in the pipe wall on both sides of the plate. In FIG. 6, a flanged perforated plate 29 comprises part of an actual pipe 26. Differential pressure is monitored between pressure taps 27 and 28 located in the pipe wall on both sides of the plate. Perforated sheet metal plates have been used extensively for experiments because of the relative ease of adapting perforated plates for such use. In actual use, wire screens will produce more desirable characteristics because they generally create lower characterizable pressure drops for a given cross section of flow blocked.

Figure 7:
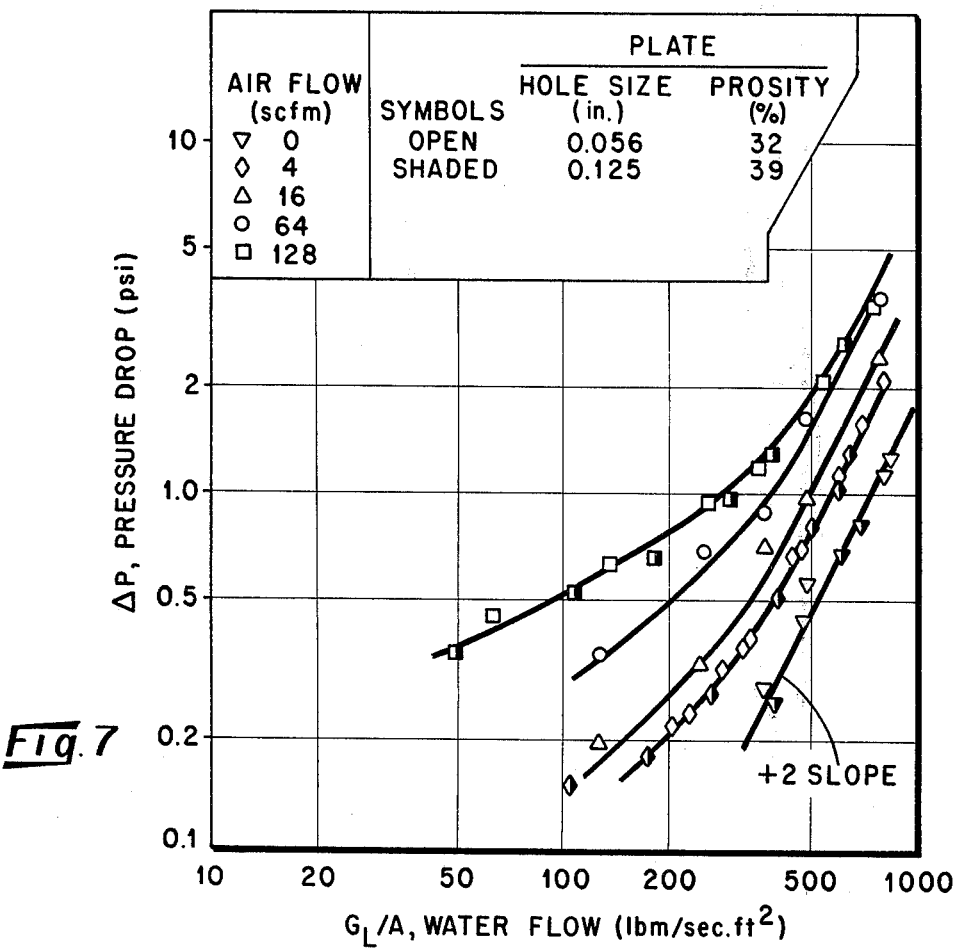
FIG. 7 is a graph showing the respective pressure drop across two different perforated plates, when used in the system of FIG. 1, as a function of both water and air flow rates.

FIG. 7 shows the pressure drop across two different perforated plates as a function of both water and air flow rates. The water flow is given as the mass flow rate, $G_L$ ($1b_m$/sec), per unit open area of the perforated plate. In FIG. 7, data shown as open symbols represent a plate with 32 percent open area, whereas shaded symbols represent a plate with 39 percent open area. Over this limited range of plate porosity, use of the mass velocity through the plate reduced data for two different plates operated at the same air flow rate to a family of singe curves with air flow rate as a parameter.

Figure 8:
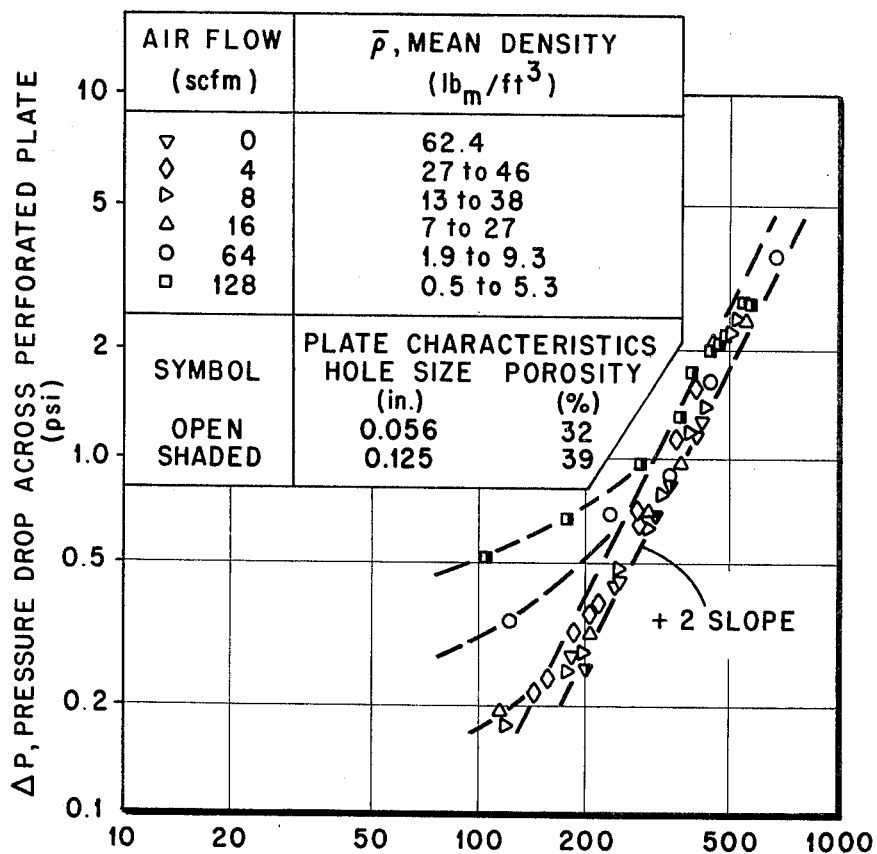
FIG. 8 is a graph illustrating the measured pressure drop across different perforated plates, when utilized in the system of FIG. 1, as a function of the flow rate of two-phase, air-water mixtures, and mean mixture density.

When the water flow is further adjusted using a function of the mean air-water mixture density, all the pressure drop data are further reduced to a single curve (see FIG. 8) at high mass flow rates. Data included represent studies with single-phase water and two-phase air-water mixtures with up to 128 scfm air; means density $\bar{\rho}$, ranged from 0.5 to 62.4 $1b_m/ft^3$. Except at mean densities less than about 3 to 5 $1b_m/ft^3$, the data are represented by:

$$\Delta P = C \left[ \frac{G_L/A}{1 + \bar{\rho}/\rho_L} \right],$$

where $\bar{\rho}$ is the mean mixture density (determined by rates of addition of air and water to the loop), $\rho_L$ is the liquid phase density, A is the cross-sectional area for flow through the plate in ft.$^2$, and when $\Delta P$ has units psi, the coefficient $C = 8.4 \times 10^6$ ($\pm$ 20 percent) psi, sec. ft$^3$/$1b_m$. Thus, the results illustrated in FIG. 8 indicate that perforated plates should be useful two-phase flow monitoring devices when utilized with pressure measuring instruments. Therefore, with a flow disperser mounted in the flange 17 and oriented transversely to the direction of mixture flow, there is another way of determining the two-phase mass flow rate through the tube of FIG. 1, or through any other two-phase flow system. This is accomplished by the use of means for measuring the pressure differential across a flow disperser, such as shown in FIG. 6, and utilizing this information along with the output of a densitometer mounted in the flow tube adjacent to and downstream of the flow disperser, whereby the two-phase mass flow rate can then be determined from the outputs of the above instruments.

Figure 9:
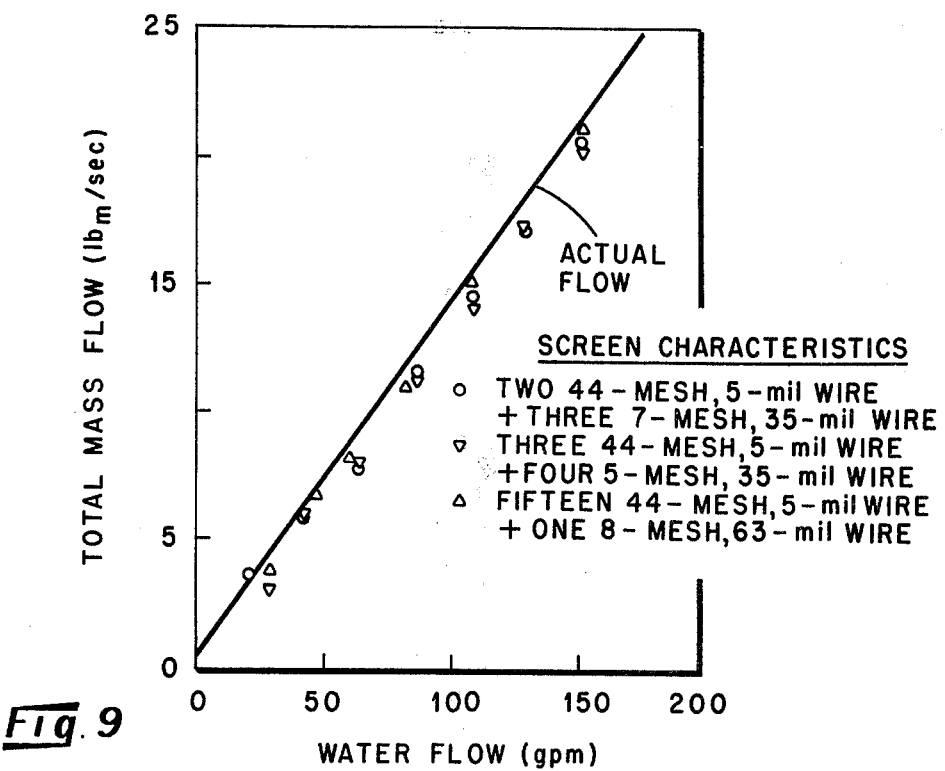
FIG. 9 is a graph illustrating the mass flow rate calculated from the output of an instrumented spool piece in FIG. 1 with the drag disk meter upstream of the turbine meter for three respective flow dispersers.

FIG. 9 shows the mass flow rate calculated from the outputs of the spool piece instruments with the drag disk meter positioned upstream of the turbine meter for three respective different flow dispersers mounted in the flange 17 of FIG. 1. FIG. 9 shows that at an air flow of 256 scfm (superficial air velocity of 64fps in the spool piece) and water flow from 20 to 150 gpm, there was no significant difference in the calculated mass flow rates when the three different flow dispersal screen arrangements were respectively utilized. The three different screen arrangements are listed on FIG. 9. These three screen arrangements do, however, have significantly different pressure drop characteristics. For the results shown in FIG. 9 at the highest flow rates (256 scfm air, 153 gpm water), pressure drop across the disperser with two, three, and fifteen 44-mesh screens was 6, 8, and 21 psi, respectively. Since increased pressure drop frequently results in increased pulsating flow, as mentioned above, it is therefore desirable to use a flow-dispersing screen that improves the accuracy of measurements over a wide range of flow rates and quality without having adverse effects on flow regime.

The system described above utilizing flanged screens or perforated plates as both a flow dispersing mechanism and a flow rate monitor provides a uniformly dispersed flow to improve the accuracy of the mass flow rate measurements, and a reproducible pressure drop signal for monitoring the flow rate through the flow disperser. It should be understood that the flow dispersing mechanism utilized in the system described above can be utilized in any vapor-liquid, two-phase flow system to be monitored and is not limited to the described test system of FIG. 1.

This invention has been described by way of illustration rather than by limitation and it should be apparent that it is equally applicable in fields other than those described.

What is claimed is:

1. In a system for monitoring transient two-phase flow rates, said system including a flow tube provided with a vertical leg having a vapor-liquid mixture flowing therethrough, said vertical leg including an instrumented piping spool piece for monitoring flow of said air and water mixture through said flow tube, said spool piece including a drag disk flowmeter, a gamma densitometer, and a turbine flowmeter, the improvement comprising a flow disperser mounted in said vertical leg of said flow tube upstream from said spool piece, and said drag disk flowmeter being positioned upstream from said turbine flowmeter, whereby the mass two-phase flow rate through said flow tube can be accurately determined from the outputs of the flow meters and the densitometer of said spool piece.

2. The system set forth in claim 1, wherein said flow disperser is a flanged screen.

3. The system set forth in claim 1, wherein said flow disperser is a flanged perforated plate.

* * * * *